United States Patent
Gurvich et al.

(10) Patent No.: US 12,320,387 B2
(45) Date of Patent: Jun. 3, 2025

(54) DRIVE SHAFT WITH NON-CYLINDRICAL SHAPE

(71) Applicant: Hamilton Sundstrand Corporation, Charlotte, NC (US)

(72) Inventors: Mark R. Gurvich, Middletown, CT (US); Brayton Reed, Rome, NY (US); Joyel M. Schaefer, Earlville, NY (US); Michael King, Sauquoit, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 12 days.

(21) Appl. No.: 17/967,085

(22) Filed: Oct. 17, 2022

(65) Prior Publication Data
US 2023/0039593 A1 Feb. 9, 2023

Related U.S. Application Data

(62) Division of application No. 16/585,009, filed on Sep. 27, 2019, now Pat. No. 11,486,439.
(Continued)

(51) Int. Cl.
*F16C 3/02* (2006.01)
*B29C 70/08* (2006.01)
(Continued)

(52) U.S. Cl.
CPC ............ *F16C 3/026* (2013.01); *B29C 70/085* (2013.01); *F16C 3/02* (2013.01); *B29L 2031/75* (2013.01);
(Continued)

(58) Field of Classification Search
CPC ........ F16C 3/026; F16C 3/02; F16C 2326/06; F16C 2326/43; B29C 70/085;
(Continued)

(56) References Cited

U.S. PATENT DOCUMENTS

| | | | |
|---|---|---|---|
| 1,862,806 | A | 6/1932 | Ringwald |
| 2,000,997 | A | 5/1935 | Sharpe |

(Continued)

FOREIGN PATENT DOCUMENTS

| | | |
|---|---|---|
| CN | 112434389 A | 3/2021 |
| DE | 629625 C | 5/1936 |

(Continued)

OTHER PUBLICATIONS

AAMT Top Drawer Teachers, Convex and Non-convex Polygons, Education Services Australia Ltd., retrieved from the internet Jul. 12, 2024, retrieved from <http://topdrawer.aamt.edu.au/geometric-reasononing/big-ideas/plane-shapes/polygons>. (Year: 2013).*

(Continued)

*Primary Examiner* — Greg Binda
(74) *Attorney, Agent, or Firm* — Carlson, Gaskey & Olds, P.C.

(57) ABSTRACT

A drive shaft extends between axial ends and has at least one portion through which an outer diameter of the drive shaft changes through an infinite number of diameters, with the at least one portion extending across at least 15% of an axial distance between the axial ends of the drive shaft. A drive shaft with a generally spiral undulation at its outer periphery is also disclosed.

18 Claims, 4 Drawing Sheets

Related U.S. Application Data

(60) Provisional application No. 62/807,051, filed on Feb. 18, 2019.

(51) Int. Cl.
 *B29L 31/00* (2006.01)
 *B64C 27/12* (2006.01)
 *F16D 3/74* (2006.01)

(52) U.S. Cl.
 CPC .......... *B64C 27/12* (2013.01); *F16C 2326/06* (2013.01); *F16C 2326/43* (2013.01); *F16D 3/74* (2013.01); *Y10S 138/11* (2013.01)

(58) Field of Classification Search
 CPC ....... B29L 2031/75; B64C 27/12; F16D 3/74; Y10S 138/11
 USPC ........................................................ 464/183
 See application file for complete search history.

(56) References Cited

U.S. PATENT DOCUMENTS

| | | |
|---|---|---|
| 2,195,993 A | 4/1940 | Morrill |
| 2,798,507 A | 7/1957 | St. Clair |
| 3,472,062 A | 10/1969 | Owen |
| 4,173,128 A | 11/1979 | Corvelli |
| 4,289,557 A | 9/1981 | Stanwood et al. |
| 4,391,594 A | 7/1983 | Hannibal et al. |
| 4,777,868 A | 10/1988 | Larsson |
| 6,328,656 B1 | 12/2001 | Uchikawa et al. |
| 6,695,705 B2 | 2/2004 | Stervik |
| 8,636,484 B2 | 1/2014 | Simmons et al. |
| 11,260,605 B2 | 3/2022 | Iyer et al. |
| 11,273,610 B2 | 3/2022 | Reed et al. |
| 2012/0283029 A1 | 11/2012 | Lawrie |
| 2014/0128168 A1 | 5/2014 | Laskey et al. |
| 2018/0335077 A1 | 11/2018 | Dessenich et al. |
| 2020/0132109 A1 | 4/2020 | Schaefer et al. |
| 2020/0298505 A1 | 9/2020 | Reed et al. |

FOREIGN PATENT DOCUMENTS

| | | |
|---|---|---|
| DE | 19908604 A1 | 12/1999 |
| EP | 3193029 A1 | 7/2017 |
| FR | 695949 | 12/1930 |
| JP | S60168913 A | 9/1985 |
| JP | 62-75135 A | 4/1987 |

OTHER PUBLICATIONS

European Search Report for EP Application No. 19212879.1 dated Jul. 10, 2020.

European Search Report for EP Application No. 21192471.7 dated Sep. 6, 2021.

European Search Report for EP Application No. 23191699.0 dated Feb. 29, 2024.

\* cited by examiner

DRIVE SHAFT WITH NON-CYLINDRICAL SHAPE

CROSS-REFERENCE TO RELATED APPLICATION

This application is a divisional of U.S. patent application Ser. No. 16/585,009 filed on Sep. 27, 2019, now U.S. Pat. No. 11,486,439 granted on Nov. 1, 2022, which claims priority to U.S. Provisional Patent Application No. 62/807,051 filed on Feb. 18, 2019.

BACKGROUND

This application relates to drive shafts having non-cylindrical shapes.

Drive shafts are known and utilized to connect any number of driven components to drive inputs. One known application is to drive propellers for an aerospace application.

Historically, drive shafts have had a cylindrical tubular portion with constant cross-section along the shaft length extending between diaphragms at each end. The diaphragms allow flexibility under bending and axial load, as the drive axes and positions between the drive input and the driven component may change.

SUMMARY

A drive shaft extends between axial ends and has at least one portion through which an outer diameter of the drive shaft changes through an infinite number of diameters, with the at least one portion extending across at least 15% of an axial distance between the axial ends of the drive shaft.

A drive shaft with a generally spiral undulation at its outer periphery is also disclosed.

These and other features may be best understood from the following drawings and specification.

DETAILED DESCRIPTION

Figure 1:
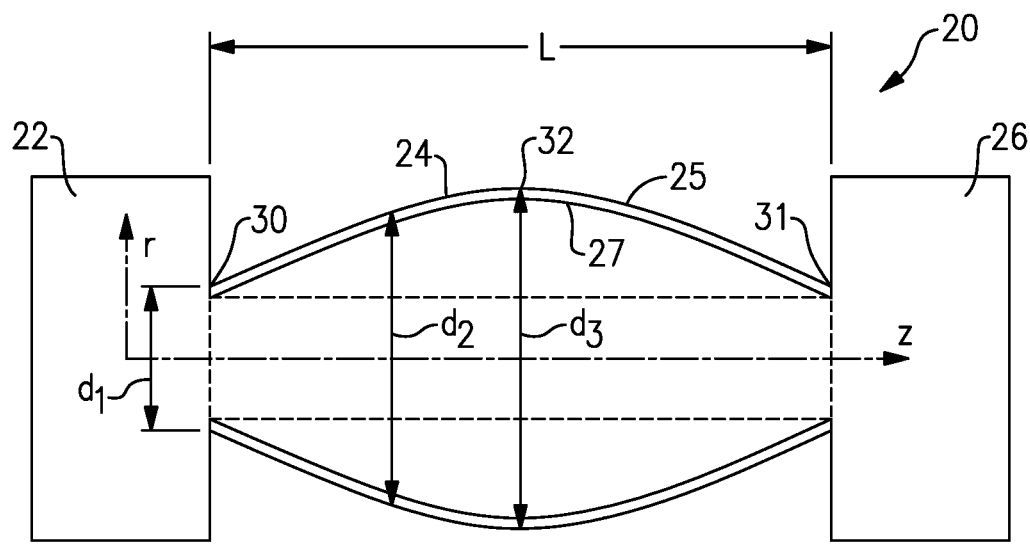
FIG. 1 shows a first embodiment.

A drive assembly 20 is illustrated in FIG. 1 as an axial cross-sectional view for connecting a drive input 22 to a component to be driven 26. The component to be driven 26 may be a propeller such as on a helicopter. However, the teachings of this disclosure extend to other drive applications.

Under some conditions, the input axis from the drive input 22 and the axis to the component 26 may shift, thus, an intermediate drive shaft 24 of length L desirably accommodates the shifting. The drive shaft 24 has an outer peripheral surface 25 and inner peripheral surface 27 extending between axial ends 30 and 31. As shown, a diameter of the drive shaft 24 changes in a continuous manner between the ends 30 and 31 in the FIG. 1 embodiment. It could be said that the diameter changes through an infinite number of diameters between the ends 30 and 31.

As shown, a first smaller diameter $d_1$ may be found at the end 30, with an intermediate increasing diameter $d_2$, and a largest diameter $d_3$ within a middle part of the drive shaft illustrated by central point 32. Of course mid-points other than the center can be used. The outer periphery 25 then returns to smaller diameters, again through an infinitely varying range of diameters until it reaches the opposed end 31. A similar definition of variable diameters applies along the inner periphery 27. A design such as shown in FIG. 1 (or FIG. 2) may be especially helpful in optimization of parameters of dynamic behavior of the shaft, such as, for example, frequencies of free vibrations.

Figure 2:
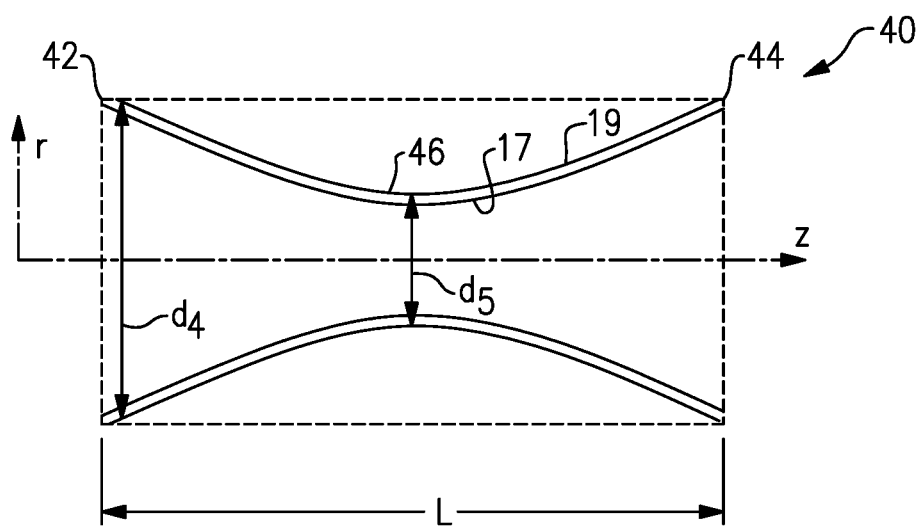
FIG. 2 shows an alternative embodiment.

FIG. 2 shows an axial cross-sectional view of a distinct embodiment wherein a drive shaft 40 extends between axial ends 42 and 44. There is a larger diameter $d_4$ at the ends 42/44 and a smaller diameter $d_5$ within a middle part of the drive shaft here the center 46. Again, middle points other than the center can be used. Here again, the diameters change through an infinite number of diameters between the ends 42 and 44. Here again, these changes occur along the outer periphery 19 and/or inner periphery 17.

The description of changing through an infinite number of diameters is to distinguish drive shafts having distinct radially outwardly extending rings, as an example. The limitation "infinite number of diameters" should be interpreted with the analysis of a curve under calculus in mind, i.e., with definition of shaft outer or inner shape as continuous variation of diameter as a function of the shaft axial position. It does not imply any particular length of curve other than as may otherwise be mentioned in this document.

Figure 3A:
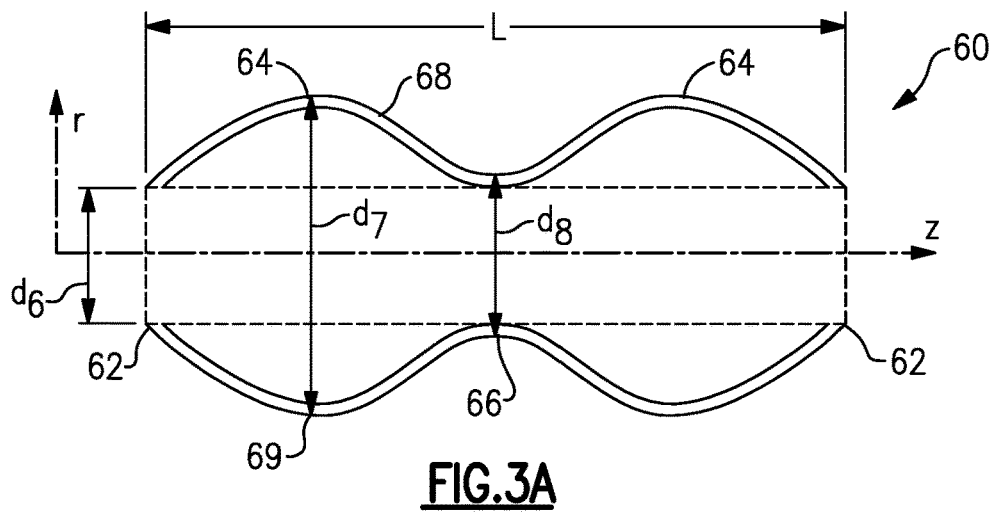
FIG. 3A shows yet another embodiment.
Figure 3B:
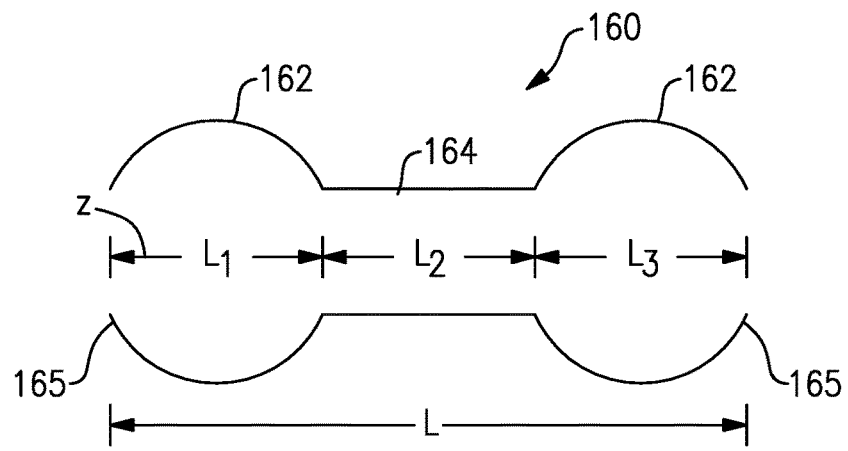
FIG. 3B shows an embodiment.

FIG. 3A shows an axial cross-sectional view of an embodiment 60 wherein there are two increasing diameter portions or subsections 64. Here, there is a diameter $d_6$ at the end 62, an enlarged diameter portion $d_7$ at intermediate portions 69 of each of the subsection 64, and another smaller diameter $d_8$ at a central portion 66. Other embodiments of the design shown in FIG. 3A may include more than two increasing diameter portions along the shaft length. Such embodiments may have, for example, three or four portions with increasing diameter. FIG. 3B shows a modification from the FIG. 3A structure. In FIG. 3B, shown as an axial cross-sectional view, a drive shaft embodiment 160 has two portions 162 similar to the portion 64 of FIG. 3A with a central portion 164 which is generally cylindrical. As shown, the portions 162 each extend for one third of the overall length L of the drive shaft 160 measured between ends 165.

The embodiments shown in FIGS. 1-3 could be said to include a drive shaft having an outer diameter measured about a rotational axis z that changes through a portion of an axial length between ends of the drive shafts and through an infinite number of diameters through a portion extending across at least 15% of the axial length. More narrowly, the infinite number of diameters occurs across at least 33% of the axial length. The axial length is illustrated as L in FIGS. 1-3. Of course, in FIGS. 1, 2 and 3A, the infinite variation in diameters occurs across the entire length L whereas in the FIG. 3B embodiment, it only occurs when lengths $L_1$ or $L_3$ are, at least, 15%, or, more narrowly, at least 33% of the entire length L.

Figure 4A:
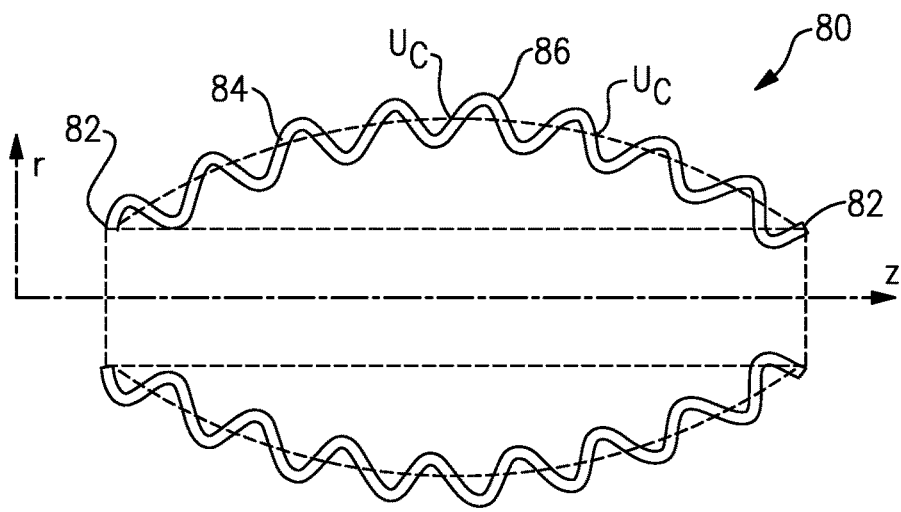
FIG. 4A shows yet another embodiment.

FIG. 4A shows an axial cross-sectional view of yet another embodiment 80 wherein the drive shaft extends between axial ends 82 and it has an outer peripheral surface 84. Local undulations in the radial direction 86 are formed in the outer peripheral portion 84. This provides an opportunity to enhance bending flexibility while maintaining high torsional stiffness.

The undulations 86 still results in the infinite variation of the outer diameter. Designs shown in FIGS. 1 and 2 are convex or concave, respectively, in the axial cross-sectional view. Similarly, each portion 64 in the design shown in FIG. 3A or each portion 162 shown in FIG. 3B are convex as well.

The term "convex" means that an axial cross-section shape extends along a curve to greater diameters to a mid-point, and then extends along a curve to smaller diameters. That is, it is bowed outwardly. The term "concave" means the opposite, and is bowed inwardly.

In contrast with these designs, introduction of local undulations makes their shapes distinguishly non-convex (or non-concave) within each portion of the shaft with variable diameter. Still, as shown in FIG. 4A, if centers $U_c$ of local undulations 86 are connected, they may generate either convex or concave shapes in the axial cross-sectional view.

These local undulations can be uniform or non-uniform along the shaft length. In other embodiments, the local undulations may be partially applied along the shaft length.

Figure 4B:
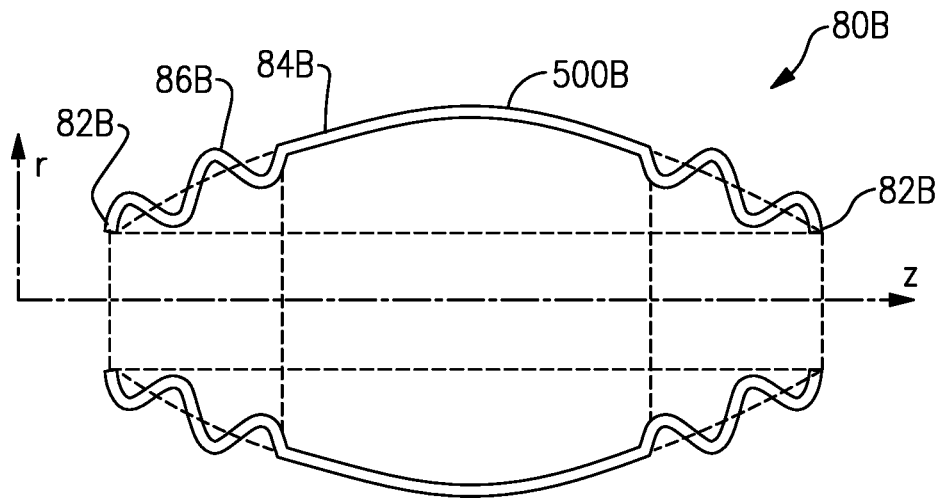
FIG. 4B shows another embodiment.

FIG. 4B shows an embodiment 80B extending between ends 82B. Local undulations 86B are formed within the outer surface 84B, and in locations adjacent the ends. There is a central location 500B without the undulations.

Figure 4C:
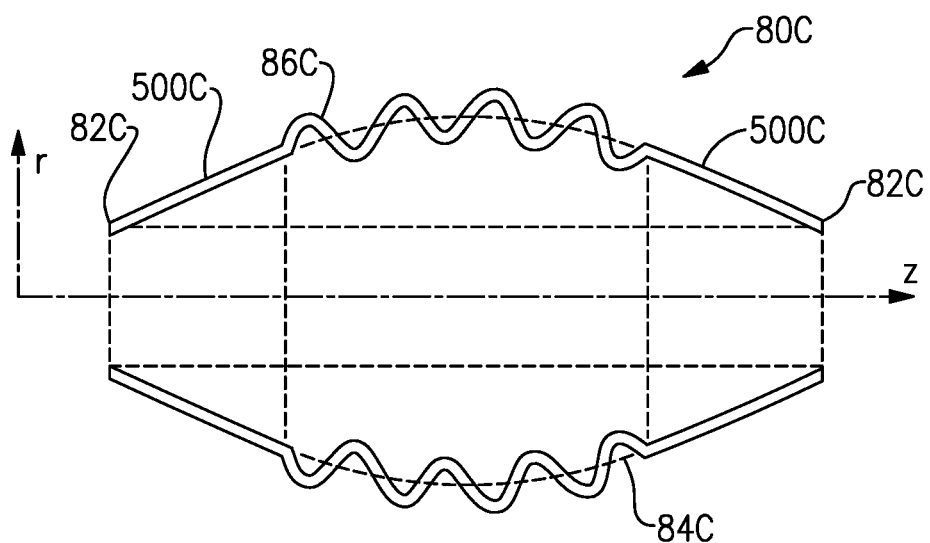
FIG. 4C shows another embodiment.

FIG. 4C shows an embodiment 80C having ends 82C. Localized undulations 86C are formed in the outer periphery 84C, and at a central area. Portions 500C without undulations are formed on each axial end of the central section.

All of the embodiments shown in FIGS. 1, 2, 3A, 3B and 4A-C (and FIG. 5D as will be disclosed below) could be said to have an effective shape that is either convex or concave along at least 15% of an axial length of the drive shaft. In embodiments the convex or concave shape extends across at least 33% of the axial length, and in at least one embodiment 100% of the axial length. The term "effective axial cross-sectional shape takes into account the feature with regard to the centers $U_c$ of the undulations along with the general shape of the drive shaft.

Similar variations with local undulations could be made to the embodiments shown in FIG. 2 or 3A and 3B.

Figure 5A:
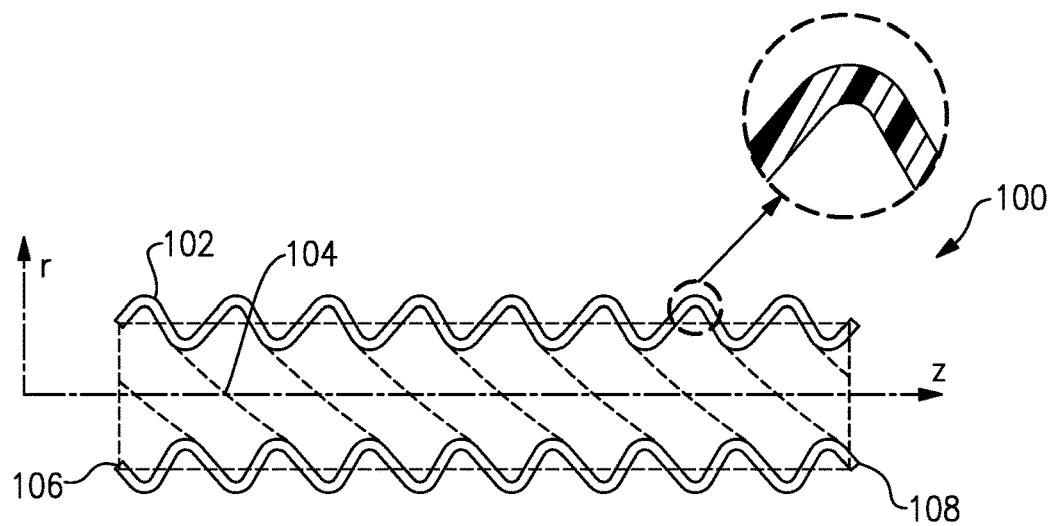
FIG. 5A shows a distinct embodiment.
Figure 5B:
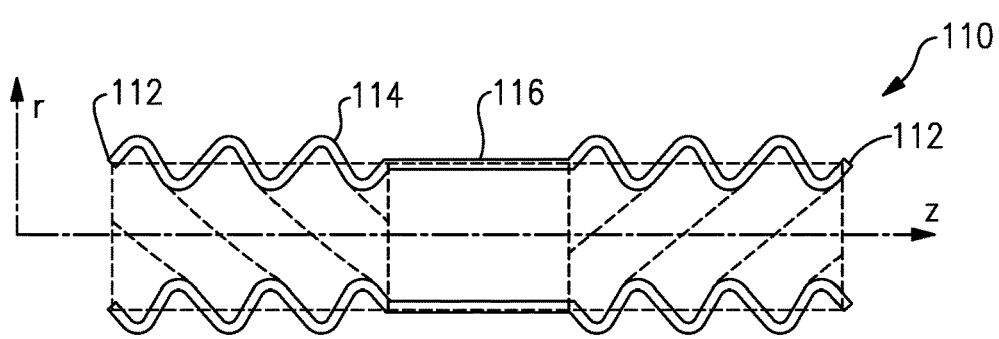
FIG. 5B shows a variation on the FIG. 5A embodiment.

FIG. 5A shows yet another drive shaft embodiment 100. Drive shaft embodiment 100 has local spiral undulations 102, which extend at a non-zero angle relative to a hoop or circumferential direction about a central axis 104. As can be seen in the embodiment 100, the undulations extend entirely between the ends 106 and 104. FIG. 5B shows a drive shaft embodiment 110 extending between ends 112. There are spiral undulations 114 adjacent each of the ends 112 with a central area 116 without undulations.

Figure 5C:
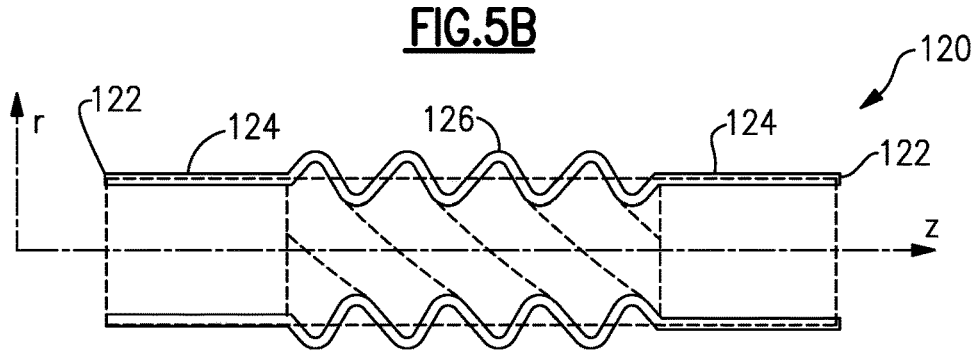
FIG. 5C shows yet another variation on the FIG. 5A embodiment.

FIG. 5C shows yet another embodiment 120 extending between axial ends 122. Here, there are areas 124 adjacent each end 122 without undulations and then a central area with undulations 126, again being spiral.

Similar variations with local spiral undulations could be made to the embodiments shown in FIGS. 1, 2, 3A and 3B.

Figure 5D:
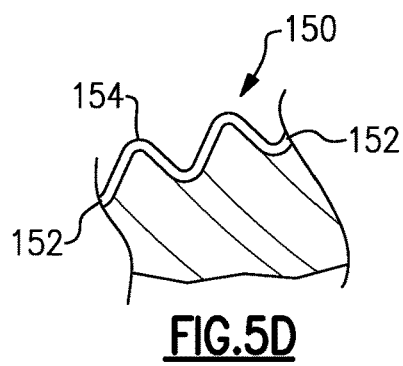
FIG. 5D shows another variation

FIG. 5D shows an example 150 wherein spiral undulations 154 formed extending along an otherwise convex or concave shape between down-selected ends 152 of a representative shaft segment. It should be understood that such a shape could extend along the entire length of the drive shaft, or portions as otherwise disclosed in this application.

The several disclosures in this application provide a designer with a powerful ability to design a drive shaft for a specific challenge. The drive shafts of this disclosure may be formed of fiber-reinforced composite material or metals. In case of composite material, thermos-set or thermoplastic resins may be used, while fiber reinforcement may be performed by carbon fibers, glass fibers, organic fibers or their combinations. In case of metallic shafts, aluminum, titanium, steel may be used for example. By carefully designing the cross-sectional shape of the shaft as a function of shaft length, additional design parameters can be optimized to achieve desired structural performance for specific load scenarios, or to satisfy contradictory trends such as, for example, a high torsional stiffness with a relatively high bending flexibility, or to satisfy challenges of excessive vibrations of relatively thin-wall lightweight designs.

A drive shaft under this disclosure could be said to have a drive shaft extending between axial ends and having at least one portion through which an outer diameter of the drive shaft changes through an infinite number of diameters. The at least one portion extends across at least 15% of an axial distance between the axial ends of the drive shaft.

A drive shaft under this disclosure could be said to have a drive shaft extending between axial ends and having an outer peripheral surface with undulations extending between relatively greater and smaller outer diameters. The undulations extend along a non-zero angle relative to a circumferential direction defined relative to a drive axis of the drive shaft.

A drive shaft under this disclosure could be said to have a drive shaft extending between axial ends and having at least one portion having an effective axial cross-sectional shape which is either convex or concave, across at least 15% of an axial distance between said axial ends of said drive shaft.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A drive shaft comprising:
   a drive shaft extending between axial ends and having an effective axial cross-sectional shape defining an outer periphery which is either convex or concave, across at least 15% of an axial distance between the axial ends of the drive shaft; and
   wherein there are local undulations along at least a portion of said outer periphery between said axial ends such that if centers of the local undulations are connected they generate the outer diameter periphery to be either a convex or concave curve in shape.

2. The drive shaft as set forth in claim 1, wherein the effective axial cross-sectional shape is convex.

3. The draft shaft as set forth in claim 1, wherein the effective axial cross-sectional shape is either convex or concave across the at least 33% of the axial distance.

4. The drive shaft as set forth in claim 1, wherein the drive shaft is formed of at least one a plastic, fiber-reinforced plastic or metals.

5. The drive shaft as set forth in claim 1, wherein the local undulations are spaced uniformly along a length defined between said axial ends.

6. The drive shaft as set forth in claim 1, wherein the local undulations are formed at the outer surface at locations adjacent each ends, and a central location in the outer surface with no local undulations.

7. The drive shaft as set forth in claim 1, wherein the local undulations are formed at the outer surface at a central area, with portions of the outer surface at each axial end formed without local undulations.

8. The drive shaft as set forth in claim 1, wherein the component to be driven is a propeller.

9. A drive shaft comprising:
a drive shaft extending between axial ends and having at least one portion through which an outer diameter of the drive shaft changes through an infinite number of diameters, with at least one portion extending across at least 15% of an axial distance between the axial ends of the drive shaft; and
wherein there are local undulations along at least a portion of said outer periphery between said axial ends such that if centers of the local undulations are connected they generate the outer diameter periphery to be either a convex or concave curve in shape.

10. The drive shaft as set forth in claim 9, wherein the drive shaft having an outer diameter increasing in diameter through an infinite number of diameters from one of the axial ends to a midpoint, and then decreasing through an infinite number of diameters to an opposed one of the axial ends.

11. The drive shaft as set forth in claim 9, wherein the drive shaft having an outer diameter at one of the axial ends and decreasing through an infinite number of diameters from the one of the axial ends through a midpoint and then increasing in diameter through an infinite number of diameters to an opposed one of the axial ends.

12. The drive shaft as set forth in claim 9, wherein the local undulations extend along the entire axial distance between the axial ends.

13. The drive shaft as set forth in claim 9, wherein the drive shaft is formed of at least one a plastic, fiber-reinforced plastic or metals.

14. The draft shaft as set forth in claim 9, wherein the effective axial cross-sectional shape is either convex or concave across the at least 33% of the axial distance.

15. The drive shaft as set forth in claim 9, wherein the local undulations are spaced uniformly along a length defined between said axial ends.

16. The draft shaft as set forth in claim 9, wherein there are local undulations formed at the outer surface at locations adjacent each ends, and a central location in the outer surface with no local undulations.

17. The drive shaft as set forth in claim 9, wherein the local undulations are formed at the outer surface at a central area, with portions of the outer surface at each axial end formed without local undulations.

18. The drive shaft as set forth in claim 9, wherein the component to be driven is a propeller.

* * * * *